US012776838B2

(12) United States Patent

Anazawa et al.

(10) Patent No.: US 12,776,838 B2

(45) Date of Patent: Oct. 27, 2026

(54) MEASUREMENT APPARATUS, MANAGEMENT SYSTEM, AND MEASUREMENT METHOD

(71) Applicant: NTT, Inc., Tokyo (JP)

(72) Inventors: Kazuya Anazawa, Musashino (JP); Toru Mano, Musashino (JP); Kei Kitamura, Musashino (JP); Yoshiaki Sone, Musashino (JP); Hideki Nishizawa, Musashino (JP)

(73) Assignee: NTT, Inc., Tokyo (JP)

( * ) Notice: Subject to any disclaimer, the term of this patent is extended or adjusted under 35 U.S.C. 154(b) by 231 days.

(21) Appl. No.: 18/719,500

(22) PCT Filed: Dec. 16, 2021

(86) PCT No.: PCT/JP2021/046547

§ 371 (c)(1),
(2) Date: Jun. 13, 2024

(87) PCT Pub. No.: WO2023/112261

PCT Pub. Date: Jun. 22, 2023

(65) Prior Publication Data

US 2025/0141546 A1 May 1, 2025

(51) Int. Cl.
*H04B 10/079* (2013.01)

(52) U.S. Cl.
CPC .............................. *H04B 10/07953* (2013.01)

(58) Field of Classification Search
None
See application file for complete search history.

(56) References Cited

U.S. PATENT DOCUMENTS

| | | | | |
|---|---|---|---|---|
| 10,374,702 | B1 * | 8/2019 | Yue | H04Q 11/00 |
| 11,546,064 | B2 * | 1/2023 | Inui | H04B 10/0779 |
| 2005/0271394 | A1 * | 12/2005 | Whiteaway | H04B 10/25133 398/188 |
| 2021/0314067 | A1 | 10/2021 | Inui et al. | |

FOREIGN PATENT DOCUMENTS

WO WO 2020/031514 2/2020

* cited by examiner

*Primary Examiner* — Jai M Lee

(74) *Attorney, Agent, or Firm* — Fish & Richardson P.C.

(57) ABSTRACT

A measurement apparatus includes a creation unit that creates a table in which a value of repeatedly applied electrical noise is associated with a bit error rate occurring at the time of application of the electrical noise in an optical transmission and reception module for transmitting a bit string to itself in a predetermined transmission mode, and an estimation unit that estimates and calculates an actual device noise curve of the optical transmission and reception module, calculates a theoretical noise curve of the optical transmission and reception module using a theoretical equation for the transmission mode, estimates and calculates a noise amount of the optical transmission and reception module from a deviation between the actual device noise curve and the theoretical noise curve, and estimates and calculates optical transmission and reception characteristics of the optical transmission and reception module as actual device characteristics using the noise amount.

8 Claims, 7 Drawing Sheets

MEASUREMENT APPARATUS, MANAGEMENT SYSTEM, AND MEASUREMENT METHOD

CROSS-REFERENCE TO RELATED APPLICATIONS

This application is a National Stage application under 35 U.S.C. § 371 of International Application No. PCT/JP2021/046547, having an International Filing Date of Dec. 16, 2021. The disclosure of the prior application is considered part of the disclosure of this application, and is incorporated by reference in its entirety into this application.

TECHNICAL FIELD

The present invention relates to a measurement apparatus, a management system, and a measurement method.

BACKGROUND ART

In the related art, there is an optical transmission and reception module that transmits or receives an optical signal using a coherent optical transmission technology (see PTL 1). The coherent optical transmission technology is a technology for performing optical transmission through polarization multiplexing, and in order to increase a communication capacity, for example, a technology is used such as a high baud rate (=increasing speed) of a symbol rate and a high multi-value (=increasing bits due to differences in modulation schemes) of a symbol rate.

CITATION LIST

Patent Literature

[PTL 1]: WO 2020/031514

SUMMARY OF INVENTION

Technical Problem

When transmission and reception characteristics for each transmission mode (each transmission mode corresponding to a combination of a baud rate and a multi-value) in the optical transmission and reception module are evaluated, it is necessary to measure optical transmission and reception characteristics (Back to Back (B to B) transmission and reception characteristics; hereinafter, actual device characteristics) of the optical transmission and reception module using a noise loading method for adding electrical noise using an optical amplifier or an optical spectrum analyzer.

However, since the above noise loading method requires a large-scale measurement apparatus and is high-risk work using strong optical power, it is difficult to easily measure actual device characteristics at an introduction site of the optical transmission and reception module (for example, an introduction site of the transmission side).

Further, since the characteristics obtained by the above noise loading method are overall actual device characteristics, including, for example, factors such as a characteristics deterioration factor due to a high multi-value, noise of the optical transmission and reception module, and a characteristics deterioration factor due to a manufacturing error, the respective deterioration factors cannot be separated and analyzed individually.

Further, when the optical transmission and reception module is applied to a Dense Wavelength Division Multiplexing (DWDM) network that performs regeneration and relaying of an optical signal using an optical amplifier, transmission and reception characteristics (hereinafter referred to as transmission characteristics) which are characteristics after a signal has passed through a transmission path deteriorate due to spontaneous emission noise or non-linear optical effects of an optical fiber generated when a signal is amplified by the optical amplifier.

When the transmission characteristics can be measured with high accuracy, a noise margin (a threshold value of noise that causes an error on the reception side) for which noise in the transmission path is considered can be set to an optimal value, and the performance of the transmission path can be maximized. However, when transmission characteristics at an introduction site of the optical transmission and reception module (an introduction site on the reception side) are evaluated, a large-scale measurement apparatus is required and high-risk work is performed, as in a scheme for measuring actual device characteristics.

The present invention has been made in view of the above circumstances, and an object of the present invention is to provide a technology capable of easily measuring optical transmission and reception characteristics.

Solution to Problem

A measurement apparatus according to an aspect of the present invention includes: a creation unit configured to create a table in which a value of repeatedly applied electrical noise is associated with a bit error rate occurring at the time of application of the electrical noise in an optical transmission and reception module for transmitting a bit string to itself in a predetermined transmission mode; and an estimation unit configured to estimate and calculate an actual device noise curve of the optical transmission and reception module using the table, calculate a theoretical noise curve of the optical transmission and reception module using a theoretical equation for the transmission mode, estimate and calculate a noise amount of the optical transmission and reception module from a deviation between the actual device noise curve and the theoretical noise curve, and estimate and calculate optical transmission and reception characteristics of the optical transmission and reception module as actual device characteristics using the noise amount.

A management system according to an aspect of the present invention is an optical transmission network management system including: a measurement apparatus for measuring optical transmission and reception characteristics; and a control apparatus for controlling an optical transmission network using a result of the measurement of the optical transmission and reception characteristics, in which the measurement apparatus includes: a creation unit configured to create a table in which a value of repeatedly applied electrical noise is associated with a bit error rate occurring at the time of application of the electrical noise in an optical transmission and reception module for transmitting a bit string to itself in a predetermined transmission mode; and an estimation unit configured to estimate and calculate an actual device noise curve of the optical transmission and reception module using the table, calculate a theoretical noise curve of the optical transmission and reception module using a theoretical equation for the transmission mode, estimate and calculate a noise amount of the optical transmission and reception module from a deviation between the actual device noise curve and the theoretical noise curve, and estimate and calculate optical transmission and reception characteristics of the optical transmission and reception module as actual device characteristics using the noise amount, and the control apparatus includes a control unit configured to control an optical output power of the optical transmission and reception module, a gain of an optical amplifier on a transmission path connected to the optical transmission and reception module, a filter bandwidth of the optical amplifier, and an optical attenuation amount of an optical attenuator using the actual device characteristics.

A measurement method according to an aspect of the present invention is a measurement method for measuring optical transmission and reception characteristics, including: a step of creating, by a measurement apparatus, a table in which a value of repeatedly applied electrical noise is associated with a bit error rate occurring at the time of application of the electrical noise in an optical transmission and reception module for transmitting a bit string to itself in a predetermined transmission mode; and a step of estimating and calculating, by the measurement apparatus, an actual device noise curve of the optical transmission and reception module using the table, calculating a theoretical noise curve of the optical transmission and reception module using a theoretical equation for the transmission mode, estimating and calculating a noise amount of the optical transmission and reception module from a deviation between the actual device noise curve and the theoretical noise curve, and estimating and calculating optical transmission and reception characteristics of the optical transmission and reception module as actual device characteristics using the noise amount.

Advantageous Effects of Invention

According to the present invention, the technology capable of easily measuring optical transmission and reception characteristics can be provided.

DESCRIPTION OF EMBODIMENTS

Hereinafter, embodiments of the present invention will be described with reference to the drawings. In the description of the drawings, the same units are denoted by the same reference sings, and description thereof is omitted.

Method of Measuring Actual Device Characteristics

A method of measuring optical transmission and reception characteristics (actual device characteristics) of an optical transmission and reception module will be described.

Figure 1:
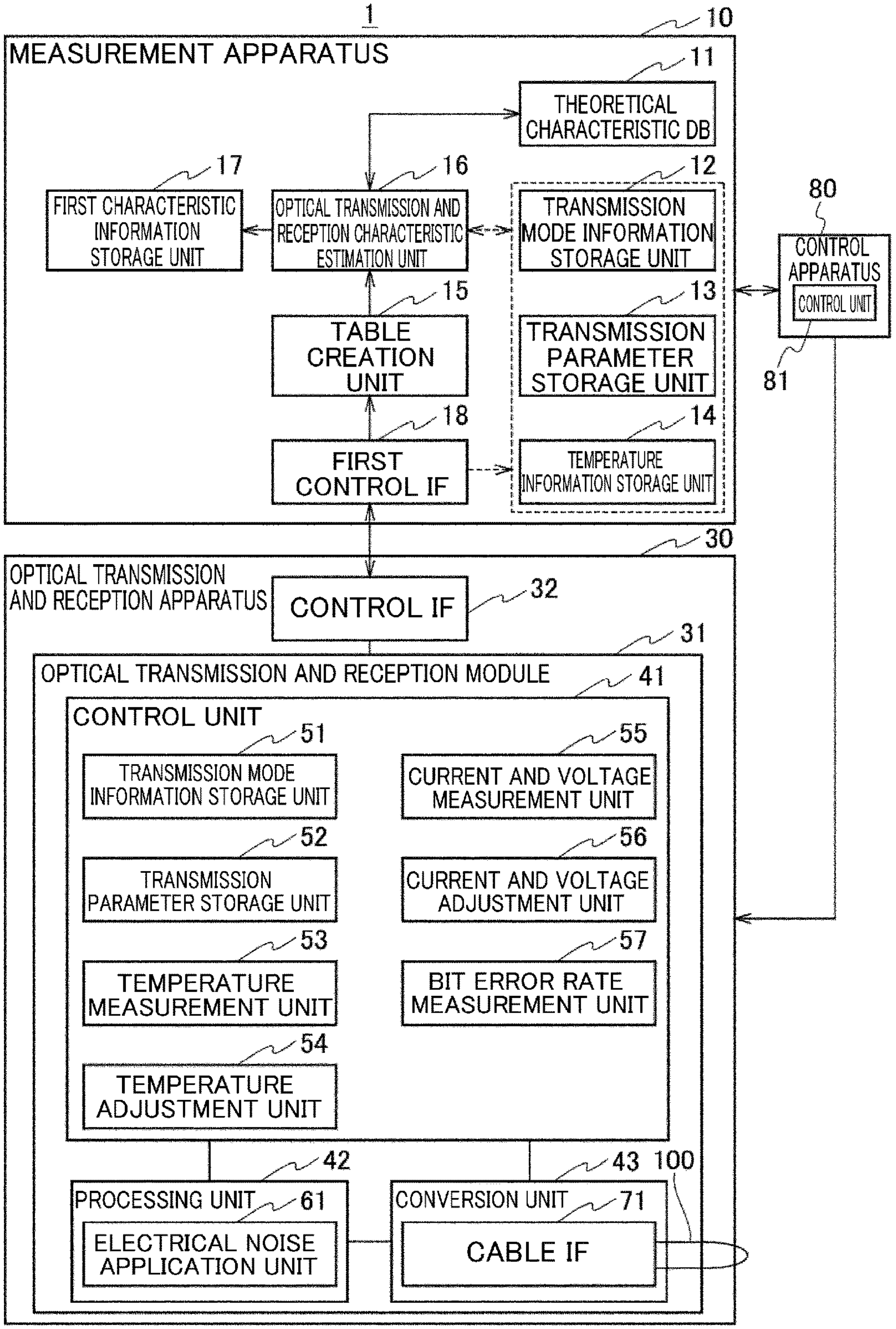
FIG. 1 is a diagram illustrating an overall configuration of an optical transmission network management system.

FIG. 1 is a diagram illustrating an overall configuration of an optical transmission network management system 1. An optical transmission network management system (management system or optical transmission system) 1 includes a measurement apparatus 10 that measures actual device characteristics of an optical transmission and reception module, an optical transmission and reception apparatus 30 that transmits or receives an optical signal using the optical transmission and reception module, and a control apparatus 80 that controls an optical transmission network including the optical transmission and reception apparatus 30 and the like using a measurement result of optical transmission and reception characteristics.

(Configuration of Optical Transmission and Reception Apparatus)

The optical transmission and reception apparatus 30 includes an optical transmission and reception module 31 that is a measurement target, and a control interface 32 for inputting or outputting data necessary for measurement.

The optical transmission and reception module 31 is a coherent module that transmits and receives optical signals using a coherent optical transmission technology. The coherent optical transmission technology is a technology that performs optical transmission through polarization multiplexing, and a high baud rate and a multi-value of a symbol rate are realized in order to increase a communication capacity. The realization of the high baud rate means increasing a modulation speed per unit time. There are, for example, 32 GBaud, 64 GBaud, 96 GBaud. The realization of the multi-value means increasing the number of bits per unit time due to a difference in modulation schemes. There are, for example, QPSK (2 bit), 8QAM (3 bits), and 16QAM (4 bit).

The optical transmission and reception module 31 includes a control unit 41 that controls the optical transmission and reception module 31, a processing unit 42 that processes an optical signal, and a conversion unit 43 that converts the optical signal into an electrical signal. Further, the optical transmission and reception module 31 also includes a peripheral apparatus such as a power supply.

The control unit 41 includes a transmission mode information storage unit 51 that stores transmission mode information on a transmission mode of the optical transmission and reception module 31, a transmission parameter storage unit 52 that stores a transmission parameter of the transmission mode, a temperature measurement unit 53 that measures a temperature of the optical transmission and reception module 31, a temperature adjustment unit 54 that adjusts the temperature, a current and voltage measurement unit 55 that measures a driving current and voltage of the optical transmission and reception module 31, a current and voltage adjustment unit 56 that adjusts the driving current and voltage, and a bit error rate measurement unit 57 that measures a bit error rate (BER) of the optical transmission and reception module 31.

The processing unit 42 includes an electrical noise application unit 61 that applies the electrical noise to the optical transmission and reception module 31. The processing unit 42 may include a bit error rate measurement unit 57 included in the control unit 41.

The conversion unit 43 includes a physical cable interface 71 that connects an optical cable 100. Here, both ends of a patch cable for loopback are looped back to the cable interface 71 in order to measure actual device characteristics of the optical transmission and reception module 31.

(Configuration of Measurement Apparatus)

The measurement apparatus 10 includes a theoretical characteristic DB 11, a transmission mode information storage unit 12, a transmission parameter storage unit 13, a temperature information storage unit 14, a table creation unit 15, an optical transmission and reception characteristic estimation unit 16, a first characteristic information storage unit 17, and a first control interface 18.

The theoretical characteristic DB 11 has a function of storing a theoretical equation for each transmission mode. The transmission mode is a transmission mode corresponding to a combination of one of a plurality of different baud rates and one of a plurality of different multi-values.

The transmission mode information storage unit 12 has a function of storing transmission mode information of the transmission mode of the optical transmission and reception module 31 acquired from the optical transmission and reception apparatus 30.

The transmission parameter storage unit 13 has a function of storing the transmission parameter of the transmission mode of the optical transmission and reception module 31 acquired from the optical transmission and reception apparatus 30.

The temperature information storage unit 14 has a function of storing temperature information of the optical transmission and reception module 31 acquired from the optical transmission and reception apparatus 30.

The table creation unit (creation unit) 15 has a function of acquiring values of the bit error rate and the electrical noise generated in the optical transmission and reception module 31 and creating a table of the bit error rate and the electrical noise. For example, the table creation unit 15 creates the table of the bit error rate and the electrical noise in which a value of a repeatedly applied electrical noise is associated with a bit error rate occurring at the time of application of the electrical noise, in the optical transmission and reception module 31 that transmits (including provisioning) a bit string to itself in a predetermined transmission mode.

The table creation unit 15 also has a function of creating a table of the bit error rate and the temperature, a table of the bit error rate and the driving current, and a table of the bit error rate and the driving voltage for the optical transmission and reception module 31.

The optical transmission and reception characteristic estimation unit (estimation unit) 16 has a function of estimating and calculating the actual device noise curve of the optical transmission and reception module 31 using the table of the bit error rate and the electrical noise, calculating a theoretical noise curve of the optical transmission and reception module 31 using a theoretical equation corresponding to the transmission mode of the optical transmission and reception module 31, estimating and calculating a noise amount of the optical transmission and reception module 31 from a deviation between the actual device noise curve and the theoretical noise curve, and estimating and calculating the optical transmission and reception characteristics of the optical transmission and reception module 31 as the actual device characteristics using the noise amount.

Further, the optical transmission and reception characteristic estimation unit 16 has a function of repeatedly performing the estimation and calculation of the actual device noise curve, and ending the estimation and calculation of the actual device noise curve when an error between a past bit error rate and a current bit error rate is equal to or smaller than a threshold value.

Further, the optical transmission and reception characteristic estimation unit 16 has a function of estimating and calculating the actual device characteristics of the optical transmission and reception module 31 with respect to a temperature change of the optical transmission and reception module 31, a change in the driving voltage of the optical transmission and reception module 31, and a change in the driving voltage of the optical transmission and reception module 31.

The first characteristic information storage unit 17 has a function of storing the actual device characteristics, temperature characteristics, current characteristics, and voltage characteristics estimated and calculated by the optical transmission and reception characteristic estimation unit 16.

The first control interface 18 has a function of inputting or outputting data necessary for measurement of the actual device characteristics, temperature characteristics, current characteristics, and voltage characteristics of the optical transmission and reception module 31 included in the optical transmission and reception apparatus 30.

(Configuration of Control Apparatus)

The control apparatus 80 includes a control unit 81.

The control unit 81 has a function of controlling the optical output power of the optical transmission and reception module 31, the gain of the optical amplifier on the transmission path connected to the optical transmission and reception module 31, the filter bandwidth of the optical amplifier, the optical attenuation amount of the optical attenuator, and the like, using the actual device characteristics, temperature characteristics, current characteristics, and voltage characteristics of the optical transmission and reception module 31.

(Procedure for Measuring Actual Device Characteristics)

Figure 2:
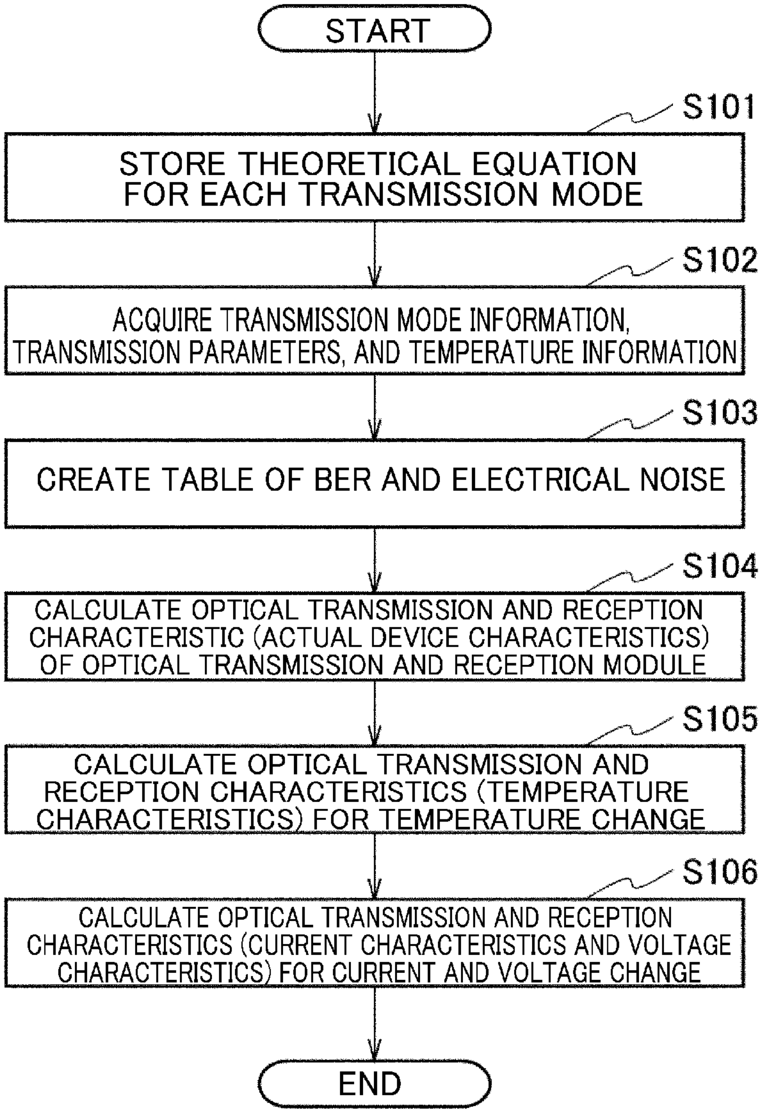
FIG. 2 is a diagram illustrating a procedure of measuring actual device characteristics.

FIG. 2 is a diagram illustrating a procedure of measuring actual device characteristics.

Step S101;

The user stores the theoretical equation for each transmission mode in theoretical characteristic DB 11 on the basis of the fact that there are a plurality of types of transmission modes. For example, the user stores a theoretical equation for a transmission mode in which a 32 GBaud baud rate and a 16QAM modulation scheme are combined, a theoretical equation for a transmission mode in which a 64 GBaud baud rate and a QPSK modulation scheme are combined, and a theoretical equation for a transmission mode in which a 64 GBaud baud rate and a 16QAM modulation scheme are combined.

Step S102;

Next, in the measurement apparatus 10, the first control interface 18 acquires transmission mode information (for example, a baud rate value or a type of modulation scheme), a transmission parameter (for example, a value of TxOSNR), and the temperature information of the optical transmission and reception module 31 from the optical transmission and reception module 31 inserted in the optical transmission and reception apparatus 30. The first control interface 18 stores the transmission mode information in the transmission mode information storage unit 12, stores the transmission parameter in the transmission parameter storage unit 13, and stores the temperature information in the temperature information storage unit 14.

Step S103;

Next, the user loops back a patch cable to the cable interface 71 of the optical transmission and reception module 31. The user applies the electrical noise to the optical transmission and reception module 31 using the electrical noise application unit 61 while transmitting and receiving a bit string to or from itself in a predetermined mode in the optical transmission and reception module 31. A bit error rate measurement unit 57 measures the bit error rate occurring in the optical transmission and reception module 31. The bit error rate measurement unit 57 measures a bit error rate each time the electrical noise is applied to the optical transmission and reception module 31. In the measurement apparatus 10, the table creation unit 15 acquires the value of the bit error rate and the value of the electrical noise from the optical transmission and reception apparatus 30, and creates the table of the bit error rate and the electrical noise in which the value of the bit error rate and the value of the electrical noise are associated with each other.

Figure 3:
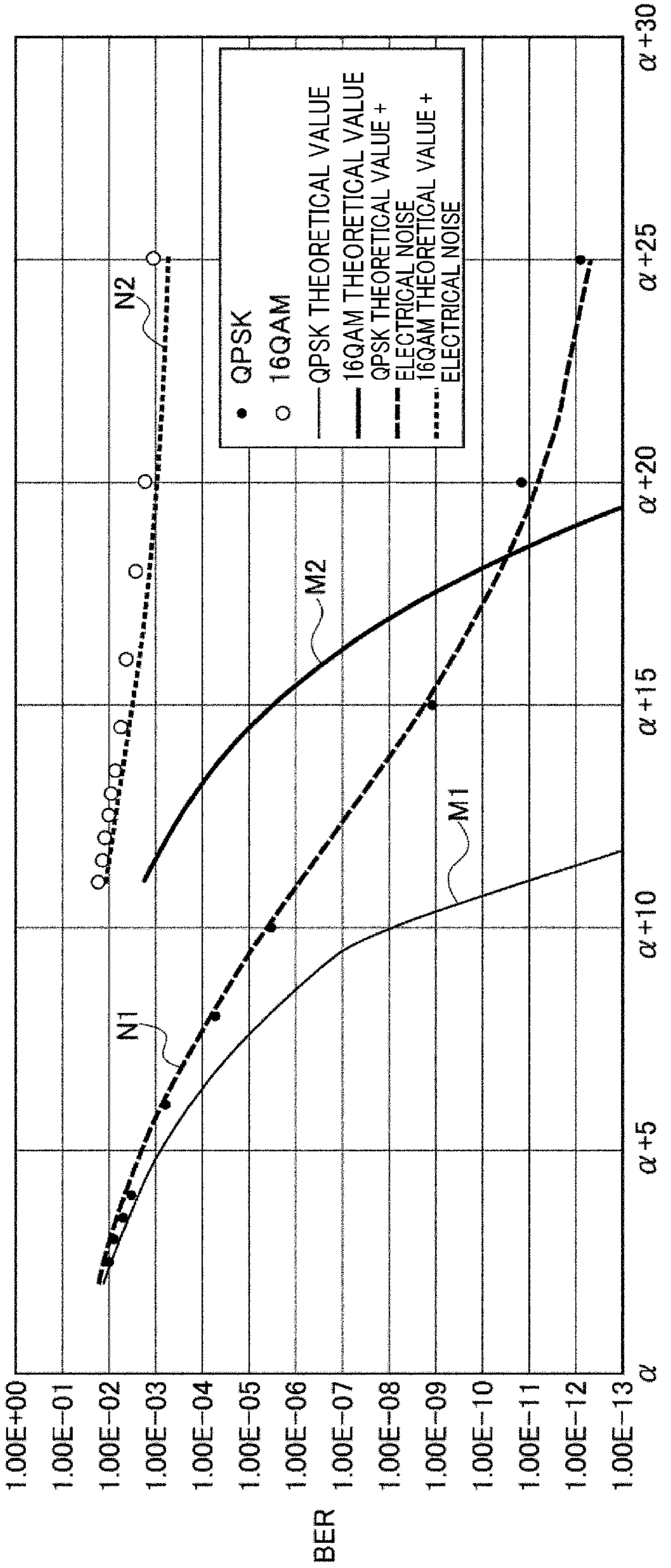
FIG. 3 is a diagram illustrating an example of a noise curve.

Step S104;

Next, the optical transmission and reception characteristic estimation unit 16 estimates and calculates the actual device noise curve of the optical transmission and reception module 31 using the table of the bit error rate and the electrical noise. For example, the optical transmission and reception characteristic estimation unit 16 obtains an optical signal to noise ratio (OSNR) on the basis of the value of the electrical noise or transmission parameter in the table, and plots the value of OSNR, and the bit error rate in the table on a graph with OSNR on a horizontal axis and BER on a vertical axis. A curve along a plurality of plotted points is set as an actual device noise curve. An example of the actual device noise curve is illustrated in FIG. 3. N1 is the actual device noise curve in the QPSK transmission mode. N2 is the actual device noise curve in the transmission mode of 16QAM.

Subsequently, the optical transmission and reception characteristic estimation unit 16 reads the transmission mode of the optical transmission and reception module 31 from the transmission mode information storage unit 12, and acquires the theoretical equation corresponding to the transmission mode from the theoretical characteristic DB 11. The optical transmission and reception characteristic estimation unit 16 uses the theoretical equation to calculate theoretical noise curve of the transmission mode. In FIG. 3, M1 is the theoretical noise curve in the transmission mode of QPSK. M2 is the theoretical noise curve in the transmission mode of 16QAM.

The optical transmission and reception characteristic estimation unit 16 estimates and calculates the noise amount of the optical transmission and reception module 31 on the basis of a value (deviation value) obtained by subtracting the theoretical noise curve from the actual device noise curve. Thereafter, the optical transmission and reception characteristic estimation unit 16 estimates and calculates the optical transmission and reception characteristics (actual device characteristics) of the transmission mode of the optical transmission and reception module 31 using the noise amount.

For the actual device characteristics, a table in which the estimated and calculated noise amount and the value of OSNR are associated with each other may be used as the actual device characteristics as it is, a noise curve corresponding to the noise amount (a curve along a plurality of plotted points plotted on a graph of BER and OSNR) may be used as the actual device characteristics, or a result obtained by dividing the value of the noise curve by the value of the actual device noise curve may be used as the actual device characteristics.

Each of the procedures from step S103 to step S104 is repeatedly performed on the actual device characteristics of one transmission mode. Each time the actual device noise curve is estimated and calculated, the error between the past bit error rate measured previously in step S103 and the current bit error rate is calculated, and the measurement of the actual device characteristics is completed and the estimation and calculation of the actual device noise curve are ended when the error is equal to or smaller than the threshold value. When the optical transmission and reception module 31 has a plurality of transmission modes, the optical transmission and reception characteristic estimation unit 16 estimates and calculates actual device characteristics in each transmission mode.

Thereafter, the optical transmission and reception characteristic estimation unit 16 stores the actual device characteristics of the optical transmission and reception module 31 in the first characteristic information storage unit 17. This actual device characteristic is the transmission and reception characteristic of an optical signal caused by internal noise of the optical transmission and reception module 31.

Step S105;

A main cause of the noise generated in the optical transmission and reception module 31 is thermal noise, and a magnitude of the thermal noise depends on temperature. Therefore, the user increases or decreases the temperature of the optical transmission and reception module 31 from a current temperature by a certain temperature using the temperature adjustment unit 54. Each time the temperature is increased or decreased by the certain temperature, the optical transmission and reception characteristic estimation unit 16 acquires the value of the bit error rate measured by the bit error rate measurement unit 57 and the temperature after the increase or decrease, and creates the table of the bit error rate and the temperature in which the value of the bit error rate is associated with the temperature. Thereafter, the optical transmission and reception characteristic estimation unit 16 estimates and calculates the optical transmission and reception characteristics for the temperature change as the temperature characteristics using the table, and stores the temperature characteristics in the first characteristic information storage unit 17.

Step S106;

Further, the user increases or decreases the driving current of the optical transmission and reception module 31 from the present current value by the certain value using the current and voltage adjustment unit 56. Each time the current value is increased or decreased by a certain value, the optical transmission and reception characteristic estimation unit 16 acquires the value of the bit error rate measured by the bit error rate measurement unit 57 and the current value after the increase or decrease, and creates a table of the bit error rate and the current in which the value of the bit error rate is associated with the current value. Thereafter, the optical transmission and reception characteristic estimation unit 16 estimates and calculates the optical transmission and reception characteristics for the current change as the current characteristics using the table, and stores the current characteristics in the first characteristic information storage unit 17.

Similarly, the optical transmission and reception characteristic estimation unit 16 estimates and calculates the optical transmission and reception characteristics for the driving voltage change of the optical transmission and reception module 31 as the voltage characteristics, and stores the voltage characteristics in the first characteristic information storage unit 17.

The procedure of measuring the actual device characteristics has been described above.

Thereafter, in the control apparatus 80, the control unit 81 controls the optical output power of the optical transmission and reception module 31, the gain of the optical amplifier on the transmission path connected to the optical transmission and reception module 31, the filter bandwidth of the optical amplifier, the optical attenuation amount of the optical attenuator, and the like, on the basis of the actual device characteristics, temperature characteristics, current characteristics, and voltage characteristics of the optical transmission and reception module 31 stored in the first characteristic information storage unit 17.

(Effects)

As described above, according to the present embodiment, the measurement apparatus 10 includes the table creation unit 15 configured to create a table in which a value of repeatedly applied electrical noise is associated with a bit error rate occurring at the time of application of the electrical noise in an optical transmission and reception module for transmitting a bit string to itself in a predetermined transmission mode; and the estimation unit 16 configured to estimate and calculate an actual device noise curve of the optical transmission and reception module using the table, calculate a theoretical noise curve of the optical transmission and reception module using a theoretical equation for the transmission mode, estimate and calculate a noise amount of the optical transmission and reception module from a deviation between the actual device noise curve and the theoretical noise curve, and estimate and calculate optical transmission and reception characteristics of the optical transmission and reception module as actual device characteristics using the noise amount, thereby easily measuring the optical transmission and reception characteristics (actual device characteristics) of the optical transmission and reception module without using a large-scale measurement apparatus.

Method of Measuring Transmission Characteristics

Next, a method of measuring optical transmission and reception characteristics (transmission characteristics) including a transmission path between transmission and reception modules will be described.

Figure 4:
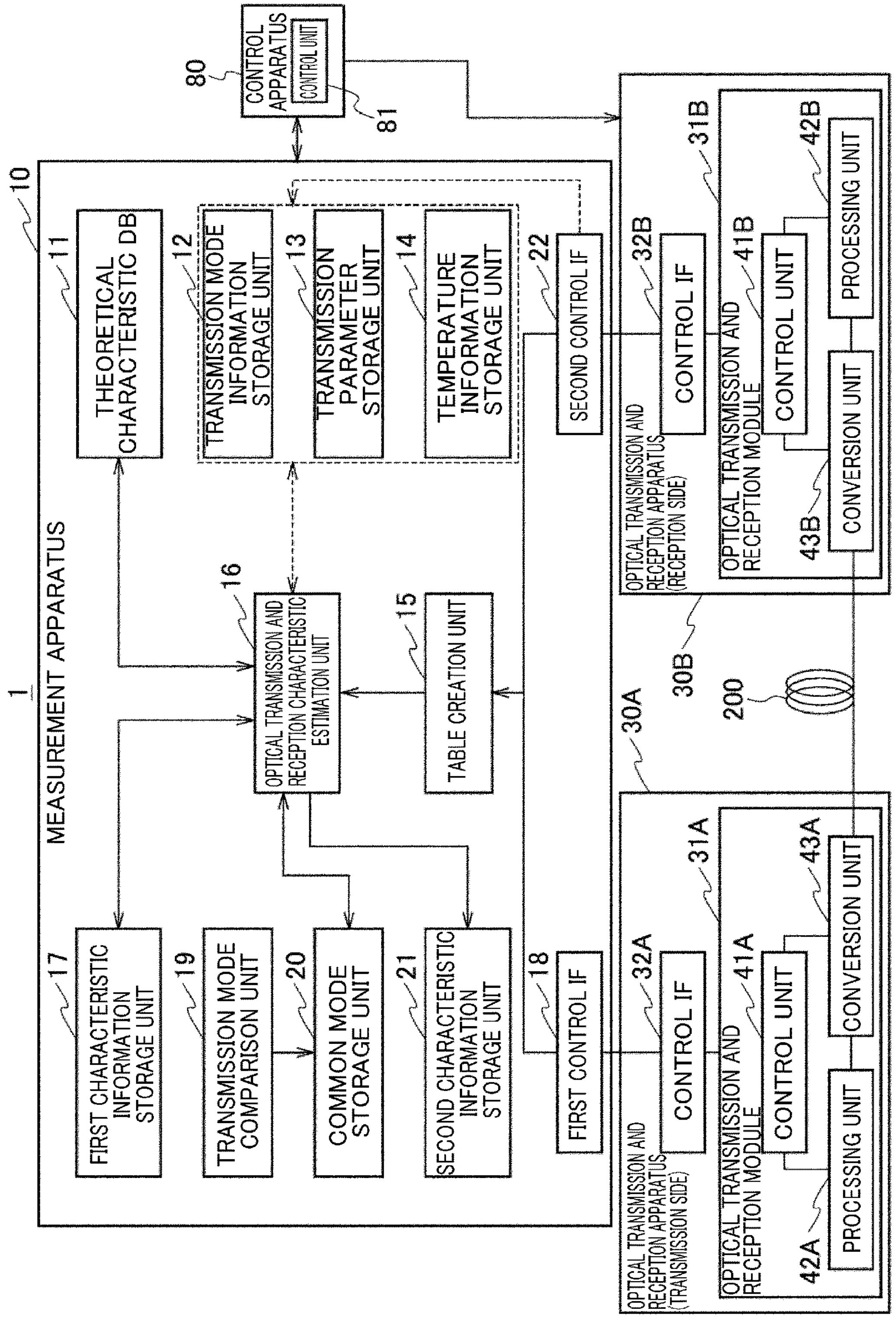
FIG. 4 is a diagram illustrating an overall configuration of the optical transmission network management system.

FIG. 4 is a diagram illustrating an overall configuration of the optical transmission network management system 1. A sign A is assigned to the optical transmission and reception apparatus 30 on the transmission side, and a sign B is assigned to the optical transmission and reception apparatus 30 on the transmission side. An optical transmission and reception apparatus 30A on the transmission side and an optical transmission and reception apparatus 30B on the reception side are connected to each other by a DWDM network 200 using a multi-stage optical amplifier.

(Configuration of Measurement Apparatus)

The measurement apparatus 10 further includes a transmission mode comparison unit 19, a common mode storage unit 20, a second characteristic information storage unit 21, and a second control interface 22.

The transmission mode comparison unit (comparison unit) 19 has a function of comparing the transmission modes included in the transmission-side optical transmission and reception module 31A with the transmission modes included in the reception-side optical transmission and reception module 31B, and specifying and listing common transmission modes.

The common mode storage unit 20 has a function of storing common transmission modes listed by the transmission mode comparison unit 19.

The table creation unit 15 has a function of creating the table of the bit error rate and the electrical noise in which a value of a repeatedly applied electrical noise is associated with the bit error rate occurring at the time of application of the electrical noise in the reception-side optical transmission and reception module 31B that receives (including provisioning) a bit string from the transmission side-optical transmission and reception module 31A in the common transmission mode via the DWDM network 200.

The optical transmission and reception characteristic estimation unit 16 has a function of estimating and calculating a transmission noise curve including noise in the DWDM network 200 using the table of the bit error rate and the electrical noise, calculating the theoretical noise curve of the transmission-side optical transmission and reception module 31A and the reception-side optical transmission and reception module 31B using the theoretical equation for the common transmission mode, estimating and calculating the inclusive noise amount including the noise amount of the transmission-side optical transmission and reception module 31A and the reception-side optical transmission and reception module 31B and the noise amount of the DWDM network 200 from a deviation between the transmission noise curve and the theoretical noise curve of the transmission side-optical transmission and reception module 31A and the reception-side optical transmission and reception module 31B, and estimating and calculating an optical transmission and reception characteristic in the DWDM network 200 as a transmission characteristic using the inclusive noise amount.

For example, the optical transmission and reception characteristic estimation unit 16 removes a noise amount based on the actual device characteristics of the transmission-side optical transmission and reception module 31A and the reception-side optical transmission and reception module 31B from the estimated and calculated inclusive noise amount, and estimates and calculates the transmission characteristics in the DWDM network 200 using the removed noise amount.

Further, the optical transmission and reception characteristic estimation unit 16 has a function of repeatedly performing the estimation and calculation of the transmission noise curve, and ending the estimation and calculation of the transmission noise curve when the error between the past bit error rate and the current bit error rate is equal to or smaller than the threshold value.

Further, the optical transmission and reception characteristic estimation unit 16 has a function of estimating and calculating the transmission characteristics with respect to the temperature change of the transmission-side optical transmission and reception module 31A and the reception-side optical transmission and reception module 31B, the change in the driving voltage of the transmission-side optical transmission and reception module 31A and the reception-side optical transmission and reception module 31B, and the change in the driving voltage of the transmission-side optical transmission and reception module 31A and the reception-side optical transmission and reception module 31B.

The second characteristic information storage unit 21 has a function of storing the transmission characteristics, temperature characteristics, current characteristics, and voltage characteristics estimated and calculated by the optical transmission and reception characteristic estimation unit 16.

The second control interface 22 has a function of inputting and outputting data necessary for measurement of the transmission characteristics, temperature characteristics, current characteristics, and voltage characteristics of the transmission-side optical transmission and reception module 31A and the reception-side optical transmission and reception module 31B and the DWDM network 200.

(Configuration of Optical Transmission and Reception Apparatus)

The optical transmission and reception apparatuses 30A and 30B on the transmission side and the reception side have the same configuration as that illustrated in FIG. 1.

(Configuration of Control Apparatus)

The control apparatus 80 has the same configuration as that illustrated in FIG. 1.

(Procedure of Measuring Transmission Characteristics)

Figure 5:
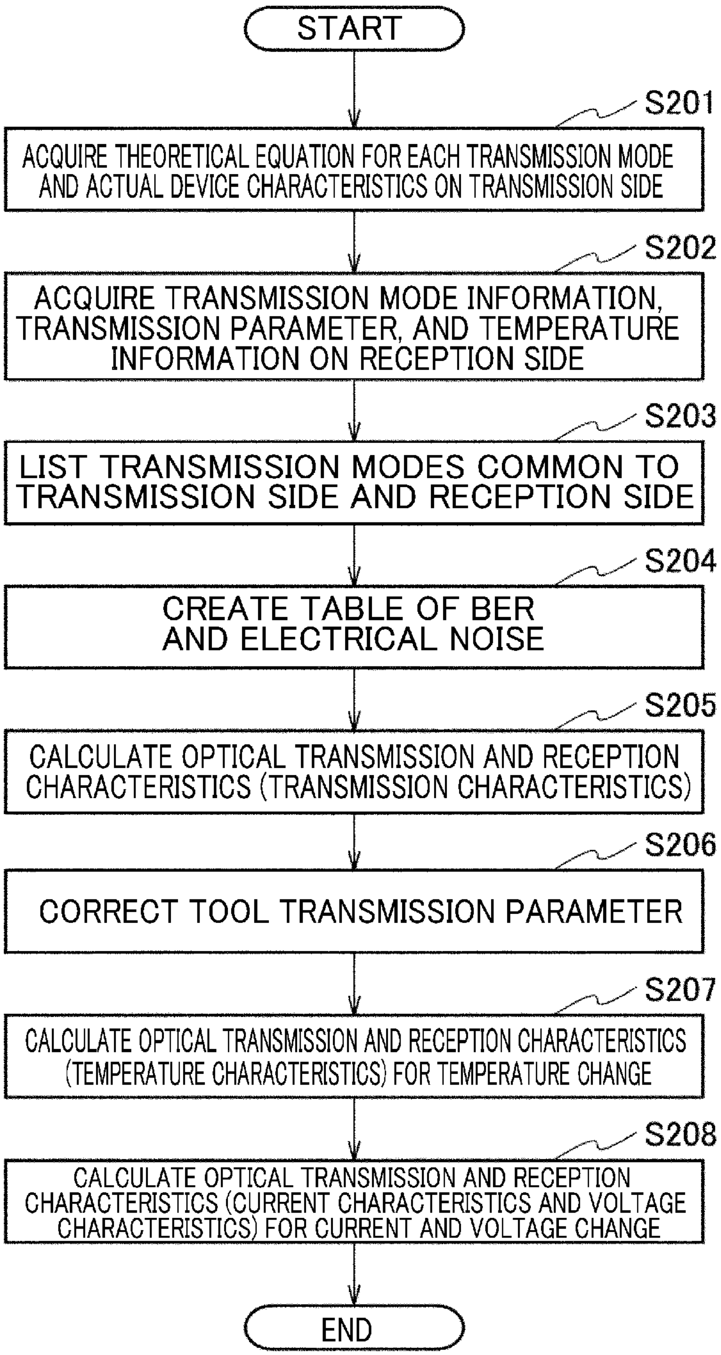
FIG. 5 is a diagram illustrating a procedure of measuring transmission characteristics.

FIG. 5 is a diagram illustrating a procedure of measuring transmission characteristics. The first characteristic information storage unit 17 stores the actual device characteristics, temperature characteristics, current characteristics, and voltage characteristics of the transmission-side optical transmission and reception module 31A.

Step S201;

In the measurement apparatus 10, the optical transmission and reception characteristic estimation unit 16 acquires the theoretical equation for each transmission mode from the theoretical characteristic DB 11, and acquires the actual device characteristics, temperature characteristics, current characteristics, and voltage characteristics of the transmission-side optical transmission and reception module 31A from the first characteristic information storage unit 17.

Step S202;

Next, the second control interface 22 acquires transmission mode information (for example, a baud rate value or a type of modulation scheme), a transmission parameter (for example, a value of TxOSNR), and the temperature information of the optical transmission and reception module 31 from the optical transmission and reception module 31B inserted into the optical transmission and reception apparatus 30B on the reception side. Thereafter, the second control interface 22 stores the transmission mode information in the transmission mode information storage unit 12, stores the transmission parameter in the transmission parameter storage unit 13, and stores the temperature information in the temperature information storage unit 14.

Step S203;

Next, the transmission mode comparison unit 19 compares the transmission modes included in the transmission-side optical transmission and reception module 31A with the transmission modes included in the reception-side optical transmission and reception module 31B, specifies and lists common transmission modes common between the two optical transmission and reception modules, and stores the common transmission modes in the common mode storage unit 20. Any existing method can be used as a method of comparing the transmission modes of the two different optical transmission and reception modules to specify common points and different points between the transmission modes.

Step S204;

Next, the user connects the transmission-side optical transmission and reception module 31A to the reception-side optical transmission and reception module 31B with the DWDM network 200 using a multi-stage optical amplifier. While the reception-side optical transmission and reception module 31B is receiving a bit string from the transmission-side optical transmission and reception module 31A in the common transmission mode, the user applies the electrical noise to the reception-side optical transmission and reception module 31B using the reception-side electrical noise application unit. The reception-side bit error rate measurement unit measures the bit error rate of the reception-side optical transmission and reception module 31B. The reception-side bit error rate measurement unit measures the bit error rate each time the electrical noise is added to the reception-side optical transmission and reception module 31B. In the measurement apparatus 10, the table creation unit 15 acquires the value of the bit error rate and the value of the electrical noise from the reception-side optical transmission and reception apparatus 30B, and creates a table of the bit error rate and the electrical noise on the reception side in which the value of the bit error rate and the value of the electrical noise are associated with each other.

Step S205;

Next, the optical transmission and reception characteristic estimation unit 16 estimates and calculates a transmission noise curve in the reception-side optical transmission and reception module 31B using the table of the bit error rate and the electrical noise on the reception side. For example, the optical transmission and reception characteristic estimation unit 16 obtains the OSNR on the basis of the value of the electrical noise or transmission parameter in the table, and plots the value of OSNR, and the bit error rate in the table on a graph with the OSNR on a horizontal axis and the BER on a vertical axis. A curve along the plurality of plotted points is set as a transmission noise curve.

Subsequently, the optical transmission and reception characteristic estimation unit 16 reads the transmission mode (common transmission mode) of the reception-side optical transmission and reception module 31B from the transmission mode information storage unit 12, and calculates theoretical noise curve for the transmission mode using the theoretical equation corresponding to the common transmission mode.

The optical transmission and reception characteristic estimation unit 16 estimates and calculates a inclusive noise amount including a noise amount of the transmission-side optical transmission and reception module 31A and the reception-side optical transmission and reception module 31B and a noise amount (spontaneous emission light noise or nonlinear optical effect) caused by a transmission path of the DWDM network 200, on the basis of a value (deviation value) obtained by subtracting the theoretical noise curve from the transmission noise curve.

Thereafter, the optical transmission and reception characteristic estimation unit 16 obtains the noise amount of the transmission-side optical transmission and reception module 31A from the actual device characteristics acquired in step S201 (or by using the noise amount obtained when estimating and calculating the actual device characteristics of the transmission-side optical transmission and reception module 31A), and further estimates and calculates the noise amount of the reception-side optical transmission and reception module 31B according to a measurement procedure of the actual device characteristics. The optical transmission and reception characteristic estimation unit 16 removes the two noise amounts from the inclusive noise amount to estimate and calculate only the noise amount caused by the transmission path of the DWDM network 200, and estimates and calculates the transmission characteristics of only the DWDM network 200 (optical transmission and reception characteristics of the transmission modes listed in step S203) as the transmission characteristics using only the noise amount.

For the transmission characteristics, a table in which the estimated and calculated noise amount and the value of OSNR are associated with each other may be used as the transmission characteristics as it is, a noise curve corresponding to the noise amount (a curve along a plurality of plotted points plotted on a graph of BER and OSNR) may be used as the transmission characteristics, or a result obtained by dividing the value of the noise curve by the value of the transmission noise curve may be used as the transmission characteristics.

Each of the procedures from step S204 to step S205 is repeatedly performed on transmission characteristics of one transmission mode. Each time the transmission noise curve is estimated and calculated, the error between the past bit error rate measured previously in step S204 and the current bit error rate is calculated, and the measurement of the transmission characteristics is completed and the estimation and calculation of the transmission noise curve are ended when the error is equal to or smaller than the threshold value. When there are a plurality of transmission modes in the list, the optical transmission and reception characteristic estimation unit 16 estimates and calculates the transmission characteristics in each transmission mode.

Thereafter, the optical transmission and reception characteristic estimation unit 16 stores the transmission characteristics in the second characteristic information storage unit 21. This transmission characteristic is a transmission and reception characteristic of an optical signal caused by noise during transmission in the DWDM network 200.

Step S206;

Next, the optical transmission and reception characteristic estimation unit 16 compares the inclusive noise amount estimated and calculated in step S205 with the estimated value of the noise calculated by a predetermined transmission path design tool and corrects the transmission parameter or inclusive noise amount for noise estimation of the transmission path design tool on the basis of a result of the comparison. This makes it possible to obtain an estimated value of the noise amount closer to actual measurement when estimating the noise amount for an optional DWDM network.

For example, there are two correction methods.

A first correction method is a method of correcting the transmission parameter of the transmission design tool using the inclusive noise amount. The inclusive noise amount is a sum of the noise N1 (internal noise) of the optical transmission and reception module and the noise N2 (spontaneous emission light noise or nonlinear optical effects) caused by the transmission path, and an individual value of each noise is unknown.

Therefore, the noise N1 is obtained in advance by performing an electric noise loading method with a loopback configuration, and the noise N2 is obtained by subtracting the noise N1 from the inclusive noise amount. Next, noise N2' caused by the transmission path is obtained by using the transmission design tool. The noise N2' calculated by the transmission design tool is compared with the actually measured noise N2, and a transmission parameter (for example, a loss factor or dispersion value of an optical fiber, or a noise index of an optical amplifier) set in the transmission design tool is corrected on the basis of a result of the comparison.

A second correction method is a method of correcting a inclusive noise amount using the estimated value of the noise estimated by the transmission design tool. The inclusive noise amount is a sum of the noise N1 (internal noise) of the optical transmission and reception module and the noise N2 (spontaneous emission light noise or nonlinear optical effects) caused by the transmission path, and an individual value of each noise is unknown.

Therefore, the noise N2 caused by the transmission path is obtained by using the transmission design tool, and the noise N1 is obtained by subtracting the noise N2 from the inclusive noise amount. A value of noise 2 changes when a transmission situation changes due to change in settings or routes of the DWDM network 200, but it is possible to estimate a sum of noise in various situations (a sum of the noise N1 and the noise N2) without transmitting the actual signal by calculating the value of the changed noise 2 with the transmission design tool.

Step S207;

Subsequently, the user increases or decreases the temperature of the transmission-side optical transmission and reception module 31A from the current temperature by a certain temperature using the transmission-side temperature adjustment unit, and also increases or decreases the temperature of the reception-side optical transmission and reception module 31B by a certain temperature using the reception-side temperature adjustment unit. Each time the temperature is increased or decreased by a certain temperature, the optical transmission and reception characteristic estimation unit 16 acquires the value of the bit error rate measured by the reception-side bit error rate measurement unit and the temperature after the increase or decrease, and creates a table of the bit error rate and the temperature in which the bit error rate and the temperature are associated with each other. Thereafter, the optical transmission and reception characteristic estimation unit 16 estimates and calculates the optical transmission and reception characteristics for the temperature change as the temperature characteristics using the table, and stores the temperature characteristics in the second characteristic information storage unit 21.

Step S208;

Further, the user increases or decreases the driving current of the transmission-side optical transmission and reception module 31A from the present current value by a certain value using the transmission-side current and voltage adjustment unit, and also increases or decreases the driving current of the reception-side optical transmission and reception module 31B by the certain value using the reception-side current and voltage adjustment unit. Each time the current value is increased or decreased by the certain value, the optical transmission and reception characteristic estimation unit 16 acquires the value of the bit error rate measured by the bit error rate measurement unit 57 and the current value after the increase or decrease, and creates a table of the bit error rate and the current value in which the bit error rate and the current value are associated with each other. Thereafter, the optical transmission and reception characteristic estimation unit 16 estimates and calculates the optical transmission and reception characteristics for the current change as the current characteristics using the table, and stores the current characteristics in the second characteristic information storage unit 21.

Similarly, the optical transmission and reception characteristic estimation unit 16 estimates and calculates the optical transmission and reception characteristics for the driving voltage change of the optical transmission and reception module 31 as the voltage characteristics, and stores the voltage characteristics in the second characteristic information storage unit 21.

The procedure of measuring transmission characteristics has been described above.

Thereafter, in the control apparatus 80, the control unit 81 controls the optical output power of the optical transmission and reception module 31, and the gain of the optical amplifier constituting the DWDM network 200, the filter bandwidth of the optical amplifier, the optical attenuation amount of the optical attenuator, and the like, on the basis of the actual device characteristics, temperature characteristics, current characteristics, and voltage characteristics of the optical transmission and reception module 31 stored in the first characteristic information storage unit 17, and the transmission characteristics, temperature characteristics, current characteristics, and voltage characteristics stored in the second characteristic information storage unit 21.

(Effects)

As described above, according to the embodiment, the measurement apparatus 10 further includes the transmission mode comparison unit 19 that compares the transmission mode included in the transmission-side optical transmission and reception module with the transmission mode included in the reception-side optical transmission and reception module to specify a common transmission mode, in which the table creation unit 15 creates a table in which a value of the repeatedly applied electrical noise and a bit error rate occurring at the time of application of the electrical noise are associated with each other in the reception-side optical transmission and reception module that receives a bit string from the transmission-side optical transmission and reception module via a transmission path in the common transmission mode, and the optical transmission and reception characteristic estimation unit 16 estimates and calculates a transmission noise curve including the noise of the transmission path using the table, calculates a theoretical noise curve of the transmission-side optical transmission and reception module and the reception-side optical transmission and reception module using a theoretical equation for the common transmission mode, estimates and calculates a inclusive noise amount including a noise amount of the transmission-side and reception-side optical transmission and reception modules and a noise amount of the transmission path from a deviation between the transmission noise curve and the theoretical noise curve of each of the optical transmission and reception modules, and estimates and calculates the optical transmission and reception characteristics in the transmission path as the transmission characteristics using the inclusive noise amount, thereby easily measuring the optical transmission and reception characteristics (transmission characteristics) in the transmission path without using a large-scale measurement apparatus.

Further, according to the embodiment, since the optical transmission and reception characteristic estimation unit 16 removes a noise amount based on the actual device characteristics related to the transmission-side and reception-side optical transmission and reception modules from the inclusive noise amount to estimate and calculate the transmission characteristics in the transmission path, it is possible to accurately measure the transmission characteristics related to only the transmission path.

Measures Against Deterioration of Optical Transmission and Reception Module

The actual device characteristics of the optical transmission and reception module 31 and the transmission characteristics of the DWDM network 200 have been described above. The deterioration of the optical transmission and reception module 31 will be mentioned. The optical transmission and reception module 31 requires a higher driving current and driving voltage to maintain a desired optical output due to high temperature or aging.

Therefore, the optical transmission and reception characteristic estimation unit 16 has a function of estimating and calculating the optical output power of the optical transmission and reception module 31 based on the actual device characteristics for a change in the driving current of the optical transmission and reception module 31 and change in the driving voltage of the optical transmission and reception module 31, with respect to a temperature change and aging change of the optical transmission and reception module 31, and transmitting the optical output power.

Further, the optical transmission and reception characteristic estimation unit 16 has a function of estimating and calculating the optical output power of the transmission-side optical transmission and reception module 31A and the reception-side optical transmission and reception module 31B based on the temperature characteristics for a change in the driving current of the transmission side optical transmission and reception module 31A and the reception side optical transmission and reception module 31B, and a change in the driving voltage of the transmission side optical transmission and reception module 31A and the reception side optical transmission and reception module 31B, with respect to a temperature change and aging change of the transmission side optical transmission and reception module 31A and the reception side optical transmission and reception module 31B, and transmitting the optical output power.

Figure 6:
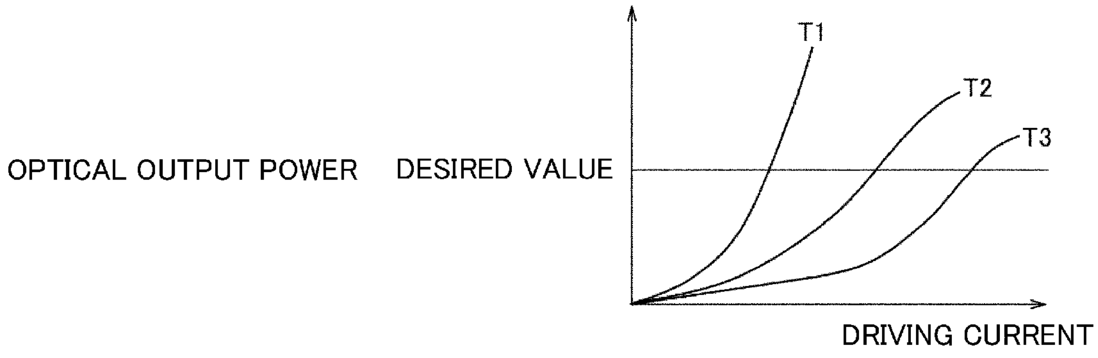
FIG. 6 is a diagram illustrating an output tendency of an optical output power due to temperature rise and aging change.

For example, the optical transmission and reception characteristic estimation unit 16 estimates and calculates an optical output power T1 of the optical transmission and reception module with respect to change in driving current regarding the optical transmission and reception module at the current temperature at a current point in time as illustrated in FIG. 6 using the temperature characteristics and the current characteristics, and shows the optical output power T1 on a graph with the driving current on a horizontal axis and an optical output power on a vertical axis. The graph also shows an optical output power T2 due to the temperature rise and aging change, and an optical output power T3 due to further temperature rise and aging change. The optical transmission and reception characteristic estimation unit 16 notifies the control apparatus 80 that noise resistance of the transmission and reception module decreases when the driving current required for the desired optical output power exceeds the threshold value, or when the optical output power is equal to or smaller than the threshold value.

This makes it possible to appropriately grasp the temperature rise and aging change of the optical transmission and reception module 31, and to maintain the optical transmission quality of the optical transmission network at a high level.

Others

The present invention is not limited to the above embodiment. The present invention can be variously modified within the scope of the gist of the present invention.

In the embodiment, the measurement apparatus 10 has been described as a separate apparatus from the optical transmission and reception apparatus 30 or the control apparatus 80, but this apparatus configuration is an example. For example, the measurement apparatus 10 may be mounted inside the optical transmission and reception apparatus 30. Similarly, the measurement apparatus 10 may be mounted inside the optical transmission and reception apparatus 30A on the transmission side, or may be mounted inside the optical transmission and reception apparatus 30B on the reception side. Further, the measurement apparatus 10 may be mounted inside the control apparatus 80.

Figure 7:
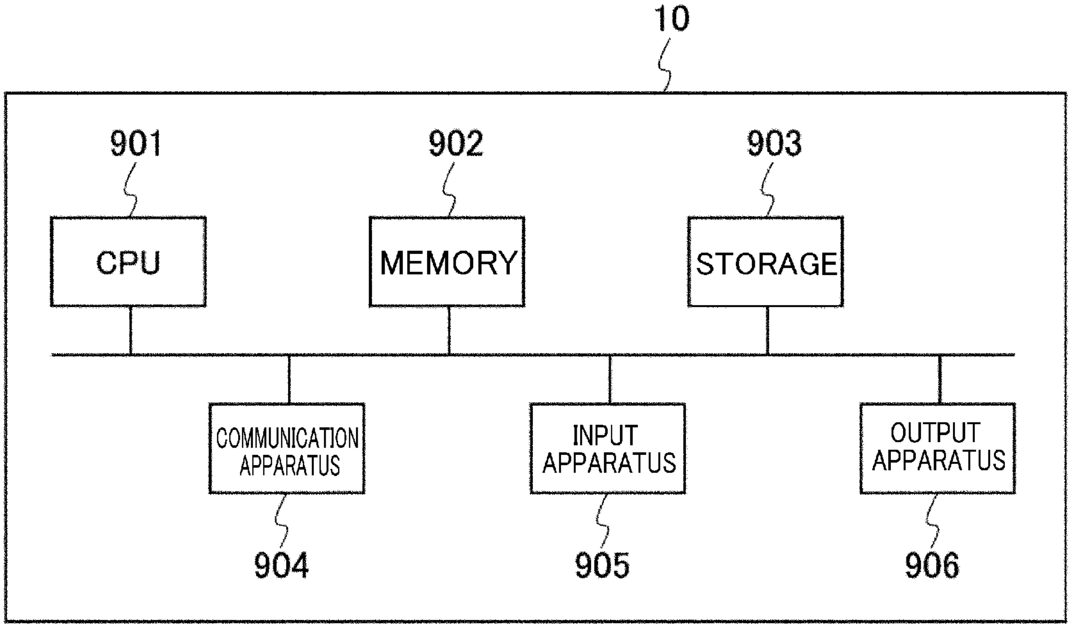
FIG. 7 is a diagram illustrating a hardware configuration of the measurement apparatus.

The measurement apparatus 10 of the present embodiment described above can be realized using a general-purpose computer system including, for example, a CPU 901, a memory 902, a storage 903, a communication apparatus 904, an input apparatus 905, and an output apparatus 906, as illustrated in FIG. 7. The memory 902 and the storage 903 are storage apparatuses. In the computer system, each function of the measurement apparatus 10 is realized by the CPU 901 executing a predetermined program loaded on the memory 902.

The measurement apparatus 10 may be mounted by one computer. The measurement apparatus 10 may be mounted with a plurality of computers. The measurement apparatus 10 may be a virtual machine mounted on a computer.

A program for the measurement apparatus 10 can be stored in a computer-readable recording medium such as an HDD, an SSD, a USB memory, a CD, and a DVD. A program for the measurement apparatus 10 can also be distributed via a communication network.

REFERENCE SIGNS LIST

1 Optical transmission network management system
10 Measurement apparatus
11 Theoretical characteristic DB
12 Transmission mode information storage unit
13 Transmission parameter storage unit
14 Temperature information storage unit
15 Table creation unit
16 Optical transmission and reception characteristic estimation unit
17 First characteristic information storage unit
18 First control interface
19 Transmission mode comparison unit
20 Common mode storage unit
21 Second characteristic information storage unit
22 Second control interface
30 Optical transmission and reception apparatus
31 Optical transmission and reception module
32 Control interface
41 Control unit
42 Processing unit
43 Conversion unit
51 Transmission mode information storage unit
52 Transmission parameter storage unit
53 Temperature measurement unit
54 Temperature adjustment unit
55 Current and voltage measurement unit
56 Current and voltage adjustment unit
57 Bit error rate measurement unit
61 Electrical noise application unit
71 Cable interface
80 Control apparatus
81 Control unit
100 Optical cable
200 DWDM network
901 CPU
902 Memory
903 Storage
904 Communications apparatus
905 Input apparatus
906 Output apparatus

The invention claimed is:

1. A measurement apparatus comprising:

a creation unit, including one or more processors, configured to create a table in which a value of repeatedly applied electrical noise is associated with a bit error rate occurring at the time of application of the electrical noise in an optical transmission and reception module for transmitting a bit string to itself in a predetermined transmission mode; and an estimation unit, including one or more processors, configured to estimate and calculate an actual device noise curve of the optical transmission and reception module using the table, calculate a theoretical noise curve of the optical transmission and reception module using a theoretical equation for the transmission mode, estimate and calculate a noise amount of the optical transmission and reception module from a deviation between the actual device noise curve and the theoretical noise curve, and estimate and calculate optical transmission and reception characteristics of the optical transmission and reception module as actual device characteristics using the noise amount.

2. The measurement apparatus according to claim 1, further comprising:

a comparison unit, including one or more processors, configured to compare a transmission mode included in a transmission-side optical transmission and reception module with a transmission mode included in a reception-side optical transmission and reception module to specify a common transmission mode, wherein the creation unit creates a table in which a value of repeatedly applied electrical noise and a bit error rate occurring at the time of application of the electrical noise are associated with each other in the reception-side optical transmission and reception module that receives a bit string from the transmission-side optical transmission and reception module via a transmission path in the common transmission mode, and the estimation unit estimates and calculates a transmission noise curve including the noise of the transmission path using the table, calculates a theoretical noise curve of the transmission-side optical transmission and reception module and the reception-side optical transmission and reception module using a theoretical equation for the common transmission mode, estimates and calculates a inclusive noise amount including a noise amount of the transmission-side and reception-side optical transmission and reception modules and a noise amount of the transmission path from a deviation between the transmission noise curve and the theoretical noise curve of each of the optical transmission and reception modules, and estimates and calculates optical transmission and reception characteristics in the transmission path as transmission characteristics using the inclusive noise amount.

3. The measurement apparatus according to claim 2, wherein the estimation unit removes a noise amount based on the actual device characteristics related to the transmission side and reception-side optical transmission and reception modules from the inclusive noise amount to estimate and calculate the transmission characteristics in the transmission path.

4. The measurement apparatus according to claim 2, wherein the estimation unit estimates and calculates the actual device characteristics or the transmission characteristics with respect to a temperature change of the optical transmission and reception module, a change in a driving voltage of the optical transmission and reception module, or a change in a driving voltage of the optical transmission and reception module.

5. The measurement apparatus according to claim 2, wherein the estimation unit repeatedly performs estimation and calculation of the actual device noise curve, ends the estimation and calculation of the actual device noise curve and repeatedly performs estimation and calculation of the transmission noise curve when an error between a past bit error rate and a current bit error rate is equal to or smaller than a threshold value, and ends the estimation and calculation of the transmission noise curve when the error between the past bit error rate and the current bit error rate is equal to or smaller than the threshold value.

6. The measurement apparatus according to claim 2, wherein the estimation unit estimates and calculates an optical output power of the optical transmission and reception module based on the actual device characteristics or transmission characteristics for a change in a driving current of the optical transmission and reception module or a change in a driving voltage of the optical transmission and reception module, with respect to a temperature change and aging change of the optical transmission and reception module, and transmits the optical output power.

7. An optical transmission network management system comprising a measurement apparatus for measuring optical transmission and reception characteristics, and a control apparatus for controlling an optical transmission network using a result of the measurement of the optical transmission and reception characteristics, wherein the measurement apparatus includes:

a creation unit, including one or more processors, configured to create a table in which a value of repeatedly applied electrical noise is associated with a bit error rate occurring at the time of application of the electrical noise in an optical transmission and reception module for transmitting a bit string to itself in a predetermined transmission mode; and an estimation unit, including one or more processors, configured to estimate and calculate an actual device noise curve of the optical transmission and reception module using the table, calculate a theoretical noise curve of the optical transmission and reception module using a theoretical equation for the transmission mode, estimate and calculate a noise amount of the optical transmission and reception module from a deviation between the actual device noise curve and the theoretical noise curve, and estimate and calculate optical transmission and reception characteristics of the optical transmission and reception module as actual device characteristics using the noise amount, and the control apparatus includes a control unit, including one or more processors, configured to control an optical output power of the optical transmission and reception module, a gain of an optical amplifier on a transmission path connected to the optical transmission and reception module, a filter bandwidth of the optical amplifier, and an optical attenuation amount of an optical attenuator using the actual device characteristics.

8. A measurement method for measuring optical transmission and reception characteristics, comprising:

creating, by a measurement apparatus, a table in which a value of repeatedly applied electrical noise is associated with a bit error rate occurring at the time of application of the electrical noise in an optical transmission and reception module for transmitting a bit string to itself in a predetermined transmission mode; and estimating and calculating, by the measurement apparatus, an actual device noise curve of the optical transmission and reception module using the table, calculating a theoretical noise curve of the optical transmission and reception module using a theoretical equation for the transmission mode, estimating and calculating a noise amount of the optical transmission and reception module from a deviation between the actual device noise curve and the theoretical noise curve, and estimating and calculating optical transmission and reception characteristics of the optical transmission and reception module as actual device characteristics using the noise amount.

* * * * *